US007054359B2

United States Patent
Kennedy et al.

(10) Patent No.: US 7,054,359 B2
(45) Date of Patent: May 30, 2006

(54) VSV-MOE PRE-EQUALIZER FOR 8-VSB DTV

(75) Inventors: Rodney A. Kennedy, Jerrabomberra (AU); Thushara D. Abhayupala, Aranda (AU)

(73) Assignee: Koninklijke Philips Electronics N.V., Eindhoven (NL)

( * ) Notice: Subject to any disclaimer, the term of this patent is extended or adjusted under 35 U.S.C. 154(b) by 786 days.

(21) Appl. No.: 10/139,173

(22) Filed: May 6, 2002

(65) Prior Publication Data

US 2002/0186763 A1    Dec. 12, 2002

Related U.S. Application Data

(60) Provisional application No. 60/297,497, filed on Jun. 12, 2001, provisional application No. 60/295,864, filed on Jun. 5, 2001.

(51) Int. Cl.
*H03H 7/30* (2006.01)
*H03H 7/40* (2006.01)
*H03K 5/159* (2006.01)

(52) U.S. Cl. .......................................... 375/232; 375/321
(58) Field of Classification Search ................ 375/232, 375/321
See application file for complete search history.

(56) References Cited

U.S. PATENT DOCUMENTS

| | | | | |
|---|---|---|---|---|
| 5,568,206 A | * | 10/1996 | Goeckler | 348/726 |
| 5,673,213 A | * | 9/1997 | Weigl | 708/322 |
| 5,793,807 A | * | 8/1998 | Werner et al. | 375/233 |
| 6,047,024 A | * | 4/2000 | How | 375/229 |
| 6,243,415 B1 | * | 6/2001 | Pipon et al. | 375/232 |
| 6,934,328 B1 | * | 8/2005 | Halder | 375/232 |

* cited by examiner

*Primary Examiner*—Stephen Chin
*Assistant Examiner*—Jia Lu
(74) *Attorney, Agent, or Firm*—Larry Liberchuk

(57) ABSTRACT

A vestigial sideband (VSB) modulation minimum output energy (MOE) pre-equalizer operating on a received ATSC 8-VSB DTV signal includes one or more of an adaptive feed-forward filter and an adaptive feedback filter each utilizing only real adaptive coefficients, with the direct term for the overall filter constrained to unity to remove one degree of filter parameterization freedom. Adaptation of the filter(s) is based on minimizing a blind energy cost function, and is independent of adaptation of a conventional adaptive channel equalizer. The pre-equalized signal is passed to the conventional adaptive equalizer for channel equalization utilizing DFE, IIR-CMA, etc., resulting in performance improvements including faster convergence and greater robustness with relatively small implementation costs.

15 Claims, 18 Drawing Sheets

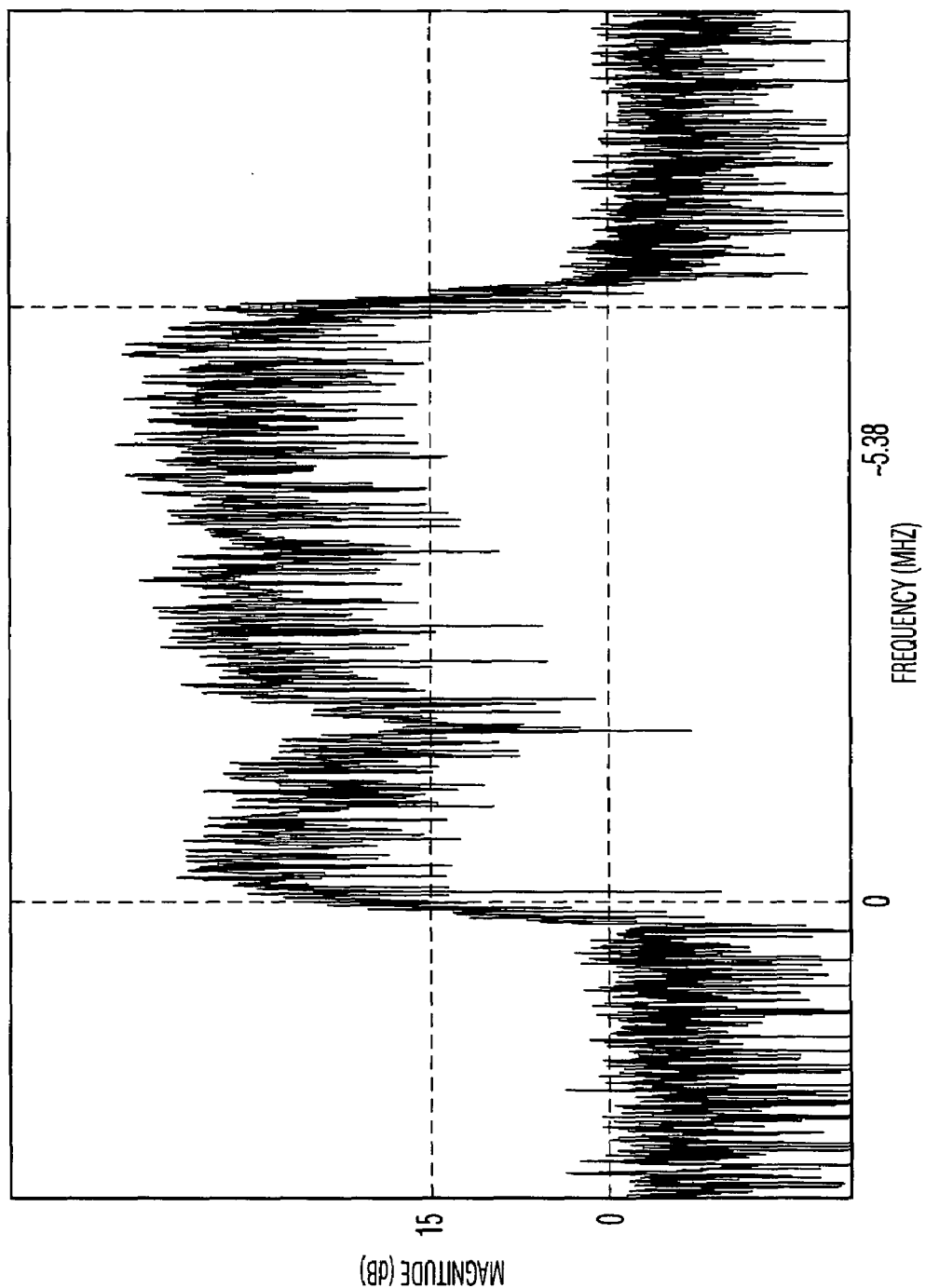

US 7,054,359 B2

VSV-MOE PRE-EQUALIZER FOR 8-VSB DTV

CLAIM FOR PRIORITY

This application claims priority to U.S. provisional applications Ser. Nos. 60/295,864 and 60/297,497 filed Jun. 5, 2001 and Jun. 12, 2001, respectively, which are incorporated herein by reference.

TECHNICAL FIELD OF THE INVENTION

The present invention is directed, in general, to channel equalization for wireless signal reception and, more specifically, to channel equalization for receivers demodulating vestigial sideband modulated wireless signals.

BACKGROUND OF THE INVENTION

Wireless communications such as those employed for digital television (DTV) broadcasts typically require channel equalization for successful demodulation and decoding of the received signal. For a variety of reasons, such as failure of sync based timing recovery schemes under multipath channel interference conditions, the performance of conventional adaptive equalizers in current use is not entirely satisfactory. Moreover, certain forms of wireless communication such as vestigial sideband modulation have specific properties that may be advantageously exploited.

There is, therefore, a need in the art for augmentation of adaptive channel equalization, and in particular augmentation customized to the particular properties of the wireless communications modulation scheme employed.

SUMMARY OF THE INVENTION

To address the above-discussed deficiencies of the prior art, it is a primary object of the present invention to provide, for use in television receiver, a vestigial sideband (VSB) modulation minimum output energy (MOE) pre-equalizer operating on a received ATSC 8-VSB DTV signal that includes one or more of an adaptive feed-forward filter and an adaptive feedback filter each utilizing only real coefficients, with the direct term for the overall filter constrained to unity to remove one degree of filter parameterization freedom. Adaptation of the filter(s) is based on minimizing an energy cost function, and is independent of adaptation of a conventional adaptive channel equalizer. The pre-equalized signal is passed to the conventional adaptive channel equalizer for channel equalization utilizing DFE, IIR-CMA, etc., resulting in performance improvements including faster convergence and greater robustness with relatively small implementation costs.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIGS. 3A–3G, 4A–4G, 5A–5G and 6A–6G relate to performance simulations for a conventional adaptive equalizer with and without a pre-equalizer according to one embodiment of the present invention.

DETAILED DESCRIPTION OF THE INVENTION

FIGS. 1 through 6G, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
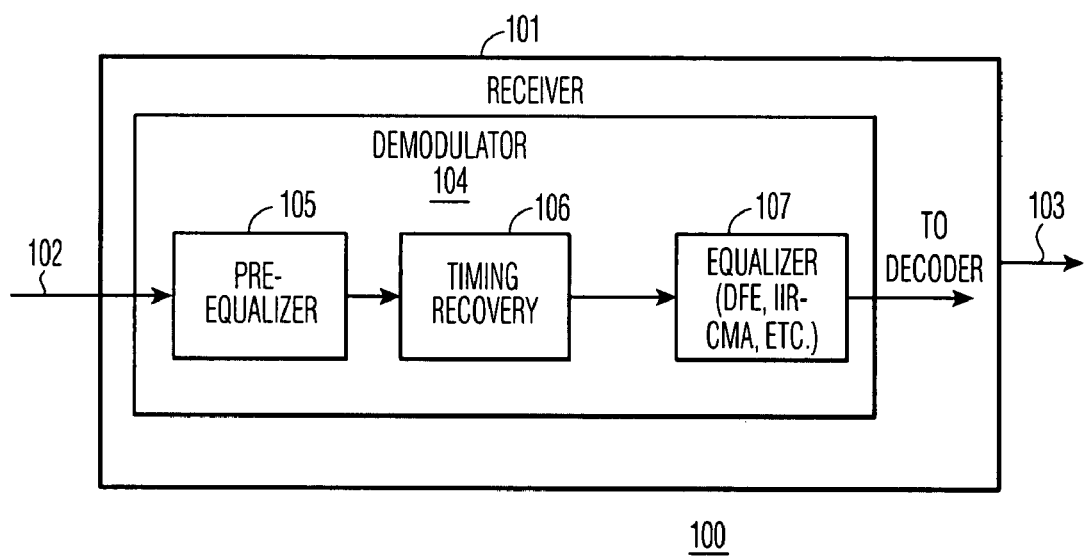
FIG. 1 depicts a wireless communications receiver system including a pre-equalizer for improved performance according to one embodiment of the present invention.

FIG. 1 depicts a wireless communications receiver system including a pre-equalizer for improved performance according to one embodiment of the present invention. Receiver system 100 includes a receiver 101, which is a digital television (DTV) receiver in the exemplary embodiment, including an input 102 for receiving wireless signals, optionally an output 103, and a demodulator 104.

In the example shown, receiver 101 is intended to receive and demodulate vestigial sideband (VSB) signals with eight discrete levels (8-VSB) according to current Advanced Television Systems Committee (ATSC) standards. However, receiver 101 may alternatively be any type of receiver for a communications system requiring communications channel equalization and employing sync based timing recovery. Receiver 101 may therefore be any audio and/or video communications receiver including a satellite, terrestrial or cable broadcast receiver and/or television, a video cassette recorder (VCR) or digital video recorder (DVR), or a digital versatile disk (DVD) player.

Those skilled in the art will recognize that the full details of the construction and operation for a complete wireless communications receiver are not depicted in the drawings or described herein. Instead, for simplicity and clarity, only so much of the construction and operation of a wireless communications system as is unique to the present invention or necessary for an understanding of the present invention is depicted and described.

Receiver 101 in the exemplary embodiment includes a pre-equalizer 105, a timing recovery loop 106, and an adaptive equalizer 107 within demodulator 104. Pre-equalizer 105 is thus intended to augment, but not replace, a conventional adaptive equalizer 107. In its simplest form according to the present invention, pre-equalizer 105 consists of a relatively short, transversal linear filter, typically with 16–24 real coefficients (although as little as a few coefficients or as many as several hundred could be employed), which acts on complex symbol spaced input samples and generates complex symbol spaced output samples. The adaptation algorithm employed is a constrained minimum output energy (MOE) blind criterion similar to the cost function employed for blind equalization without gain identification, but uniquely exploiting the properties of vestigial sideband modulation.

In vestigial sideband modulation the lower sideband is missing and contains no significant signal energy (i.e., no significant information that can improve performance), such that the principle equalizer design issue is to avoid adverse noise enhancement in this lower sideband—that is, avoid high equalizer gains in this sideband since such gains would only amplify noise. The solution adopted in the present invention is to constrain the pre-equalizer filter 105 to being purely real, which may be regarded as a complex filter having an imaginary part of zero. Because this constraint implies a symmetric filter magnitude response, the modest gains that apply at any positive frequency are constrained to also apply at negative frequencies, the feature which limits noise amplification.

FIGS. 2A through 2D illustrate a pre-equalizer filter in accordance with various embodiment of the present invention. The structure and operation of the pre-equalizer 105 are specifically tailored for vestigial sideband modulation transmissions in the present invention.

The operation of pre-equalizer 105 is described herein in the complex baseband representation, where the lower sideband is largely absent. In this context, complex baseband representation means the signals are complex and at the symbol rate (thus forming Nyquist samples). As such, the pre-equalizer 105 accepts a complex signal as input, convolves with real coefficients, and outputs a complex signal.

Figure 2A:
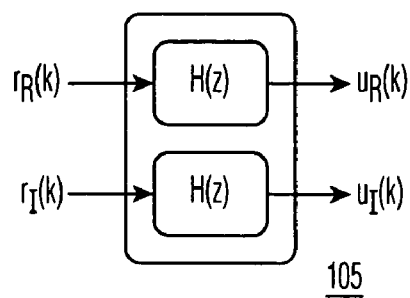
FIGS. 2A through 2D illustrate a pre-equalizer filter in accordance with various embodiment of the present invention.

FIG. 2A illustrates the input and output relationships of the real pre-equalizer filter. H(z) denotes the Z-transform of the real pre-equalizer filter 105 according to:

$$H(z) = h_0 + h_1 z^{-1} + h_2 z^{-2} + \ldots$$

where $h_0$, $h_1$, $h_2$, etc. are real. Let r(k) denote the complex input of the real pre-equalizer filter 105 at time k, with real and imaginary components denoted:

$$r_R(k) = Re\{r(k)\},$$

$$r_I(k) = Im\{r(k)\},$$

and let u(k) denote the complex output of the real pre-equalizer filter 105 at time k, with real and imaginary components denoted:

$$u_R(k) = Re\{u(k)\},$$

$$u_I(k) = Im\{u(k)\}.$$

Then the real pre-equalizer filter constrains its action to the following input-output relationship as illustrated in FIG. 2A:

$$u_R(k) = H(q) r_R(k)$$

$$u_I(k) = H(q) r_I(k)$$

where H(q) is the delay operator form of the filter with Z-transform H(z). Thus, in the generalized filter input-output relationship illustrated in FIG. 2A, the filter H(z) coefficients are real values and the same for the upper and lower branches, while the input r(k) and the output u(k) are both complex.

The real pre-equalizer filter 105 is significantly simpler than a complex filter, which may be expressed in terms of four distinct real filters. For the real pre-equalizer filter 105, only two filters, constrained to have identical coefficients, are required. While the reason for using two non-distinct real filters is to facilitate inhibition of adverse noise enhancement when equalizing vestigial sideband modulated signals rather than simplification of the filter implementation, the constraint also results in implementation simplifications.

Figure 2B:
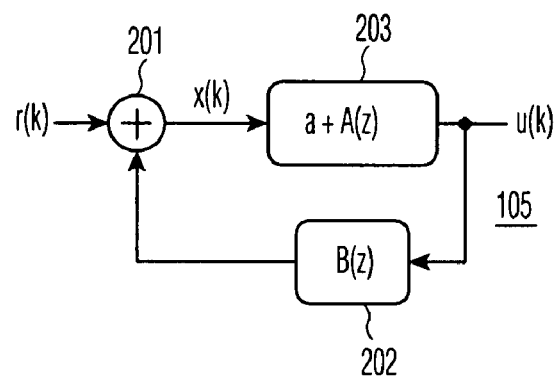

The real pre-equalizer filter 105 has a linear Z-transform H(z), which may be represented in the following manner to define a class of filters tailored specifically for implementation:

$$H(z) = \frac{a_0 + A(z)}{1 + B(z)(a_0 + A(z))} \quad (1)$$

where $$A(z) = \sum_{m=1}^{M} a_m z^{-m} \text{ and } B(z) = \sum_{n=1}^{N} b_n z^{-n},$$

which corresponds to the structure in FIG. 2B, where all filter coefficients are real valued but input r(k) and output u(k) are both complex. In the embodiment of FIG. 2B, pre-equalizer 105 is an auto-regressive moving average (ARMA) realization in which the feedback parameter B(z) introduced by filter component 202 at signal adder 201 is based on the feed-forward parameter $a_0 + A(z)$ introduced by filter component 203.

Figure 2C:
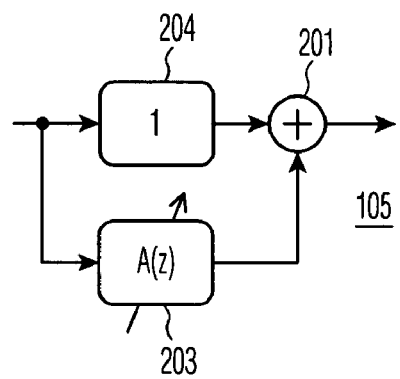
Figure 2D:
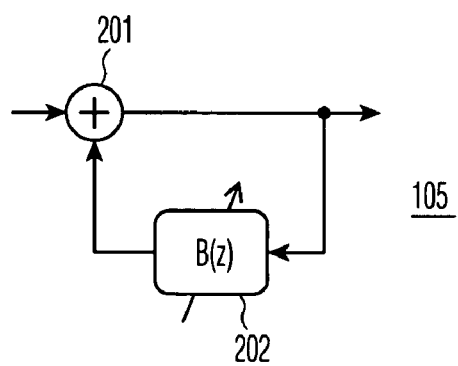

When B(z)=0, a purely transversal realization results as illustrated in FIG. 2C, in which the feedback parameter B(z) of the pre-equalizer 105 is zero and the adaptive feed-forward parameter A(z) introduced by filter component 203 at signal adder 201 is real, with unity gain by filter component 204. When A(z)=0, a purely recursive realization results as illustrated in FIG. 2D, in which the feed-forward parameter A(z) of the pre-equalizer 105 is zero and the adaptive feedback parameter B(z) introduced by filter component 202 at signal adder 201 is real, automatically producing a unity direct term due to the closed loop. Otherwise, the auto-regressive moving average filter realization illustrated in FIG. 2B is achieved.

In the present invention, the filter coefficients for the real pre-equalizer filter 105 are permitted to change (under adaptation) with a constraint removing one degree of freedom. For example, if the pre-equalizer filter 105 is purely transversal:

$$H(z) = \sum_{m=0}^{M} a_m z^{-m},$$

where the $a_m$ are real coefficients, then the simplest constraint is $a_0=1$, which implies, from equation (1) above with $B(z)=0$ (since there is no recursive portion) that $$H(z)=1+A(z).$$

The remaining real coefficients $\{a_1, a_2, \ldots a_M\}$ are free to be adapted. This adaptive transversal real pre-equalizer filter system is illustrated in FIG. 2C, where $A(z)$ is adapted and is strictly proper (i.e., has no direct term) and the direct term of the overall filter is constrained to unity.

More generally, if $X=[a_0 a_1 \ldots a_M b_1 b_2 \ldots b_N]'$ is the total real parameter space, then one degree of freedom may be removed by an arbitrary linear constraint of the form:

$$X'C=1, \qquad (2)$$

where C is a non-zero constant vector of dimension M+N+1. Equation (2) above represents a hyperplane in the total real parameter space, with the only important feature being that the hyperplane does not pass through the origin. For example, $23a_7-2 a_{11}+3b_3=1$ is one typical linear constraint. Knowledge of how to adapt under a more general linear constraint of this type is common general knowledge to those working with adaptive systems and is not described in detail herein.

In the purely recursive case when $A(z)=0$, the most appropriate constraint is $a_0=1$ which implies:

$$H(z) = \frac{1}{1 + B(z)}.$$

This filter arrangement is illustrated in FIG. 2D, where $B(z)$ is adapted and is strictly proper (i.e., has no direct term) and the direct term of the overall filter is implicitly constrained to unity.

Adaptation of the remaining parameters (those not constrained by removal of one degree of freedom) may be freely adapted. In the present invention, a cost function corresponding to blind equalization based on energy cost is selected for controlling adaptation of the remaining parameters for several reasons: (i) an energy cost depends only on the second order statistics of the channel, and will therefore exhibit quick convergence; (ii) the energy cost is convex and remains so under the imposed linear constraint, which implies well-behaved convergence; (iii) the cost is phase blind, acting only to correct magnitude distortions in the channel; (iv) the cost itself is blind and may therefore be easily implemented without relying on training data; and (v) the cost function effectively deals (only) with the minimum phase portion of the channel distortion.

The energy cost function to be minimized in the present invention is given by:

$$J=E\{|u(k)|^2\}=E\{u_R^2(k)+u_I^2(k)\}. \qquad (3)$$

Variants on this cost function are possible, such as a convex combination of the real and imaginary components which subsumes the far right-hand portion of equation (3) above as a special case. Such variants do not represent significant modifications and qualitatively perform similarly.

In illustrating the adaptation, the simplest constraint is selected, where $a_0=1$. Under the usual stochastic gradient descent, the adaptation equations become $$a_m(k+1)=a_m(k)-\mu_{a[u]}(k)x_I(k-m)+u_R(k)x_R(k-m)] \qquad (4)$$

and $$b_n(k+1)=b_n(k)-\mu_{b[u]}(k)u_I(k-n)+u_R(k)u_R(k-n)] \qquad (5)$$

where $x(k)$ is the output of the signal adder 201 within the pre-equalizer 105 illustrated in FIG. 2B and $x_R(k)$ and $x_I(k)$ are the real and imaginary components, respectively, of that output. For the recursive portion, a standard gradient approximation is performed, which assumes certain contributions from recursive terms are zero. Such aspects are common general knowledge to those skilled in adaptive systems, as are standard variations using more computationally demanding filter regressor forms that may alternatively be employed.

In performance terms, when acting in conjunction with a following conventional adaptive equalizer 107, the pre-equalizer 105 offers the following advantages: (i) adaptation of pre-equalizer 105 is independent of (decoupled from) adaptation of conventional adaptive equalizer 107; (ii) pre-equalizer 105 exhibits fast convergence; (iii) pre-equalizer 105 improves the convergence speed and robustness of the following conventional adaptive equalizer 107; and (iv) pre-equalizer 105 provides significant performance improvements with relatively small implementation cost.

Simulations were performed utilizing a conventional infinite impulse response constant modulus adaptive (IIR-CMA) algorithm equalizer, with and without a VSB minimum output energy (MOE) pre-equalizer of the type illustrated in FIGS. 2A through 2D and described above. The conventional adaptive equalizer employed is capable of operating in both CMA and decision directed (DD) modes, starting in CMA mode and switching to DD mode when the mean square error drops below 27% but switching back to CMA mode if the mean square error exceeds 30%. Both feed-forward (FF) and feedback (FB) filters were employed in the VSB-MOE pre-equalizer. The simulation was performed using the following parameters:

MOE FB filter length=24
FF filter length=64
FB filter length=300
MOE FB filter step size=0.0005
IIR-CMA FF filter step size=0.0004 (CMA mode), 0.003 (DD mode)
IIR-CMA FB filter step size=0.00005 (CMA mode), 0.001 (DD mode)

FIGS. 3A through 3G correspond to the simulation with the VSB-MOE pre-equalizer, while FIGS. 4A through 4G correspond to the simulation without the VSB-MOE pre-equalizer.

Figure 3A:
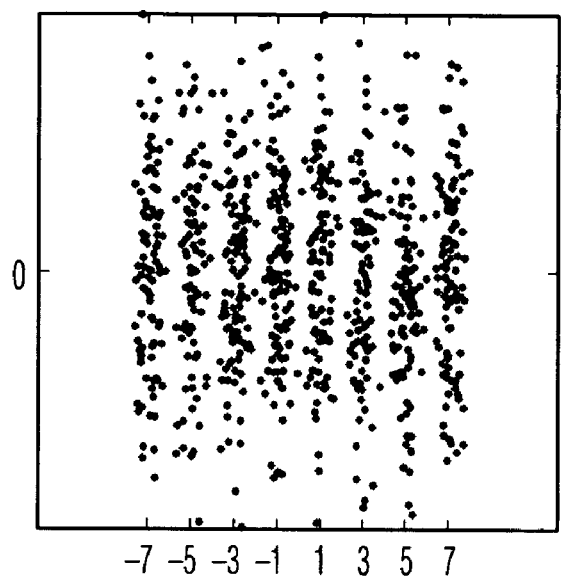
Figure 3B:
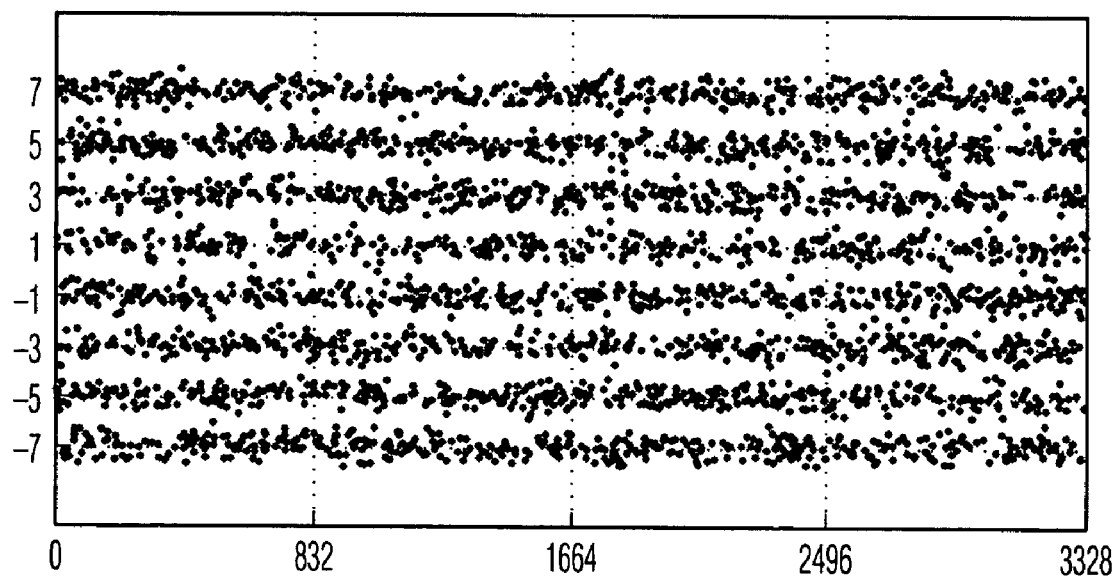
Figure 3C:
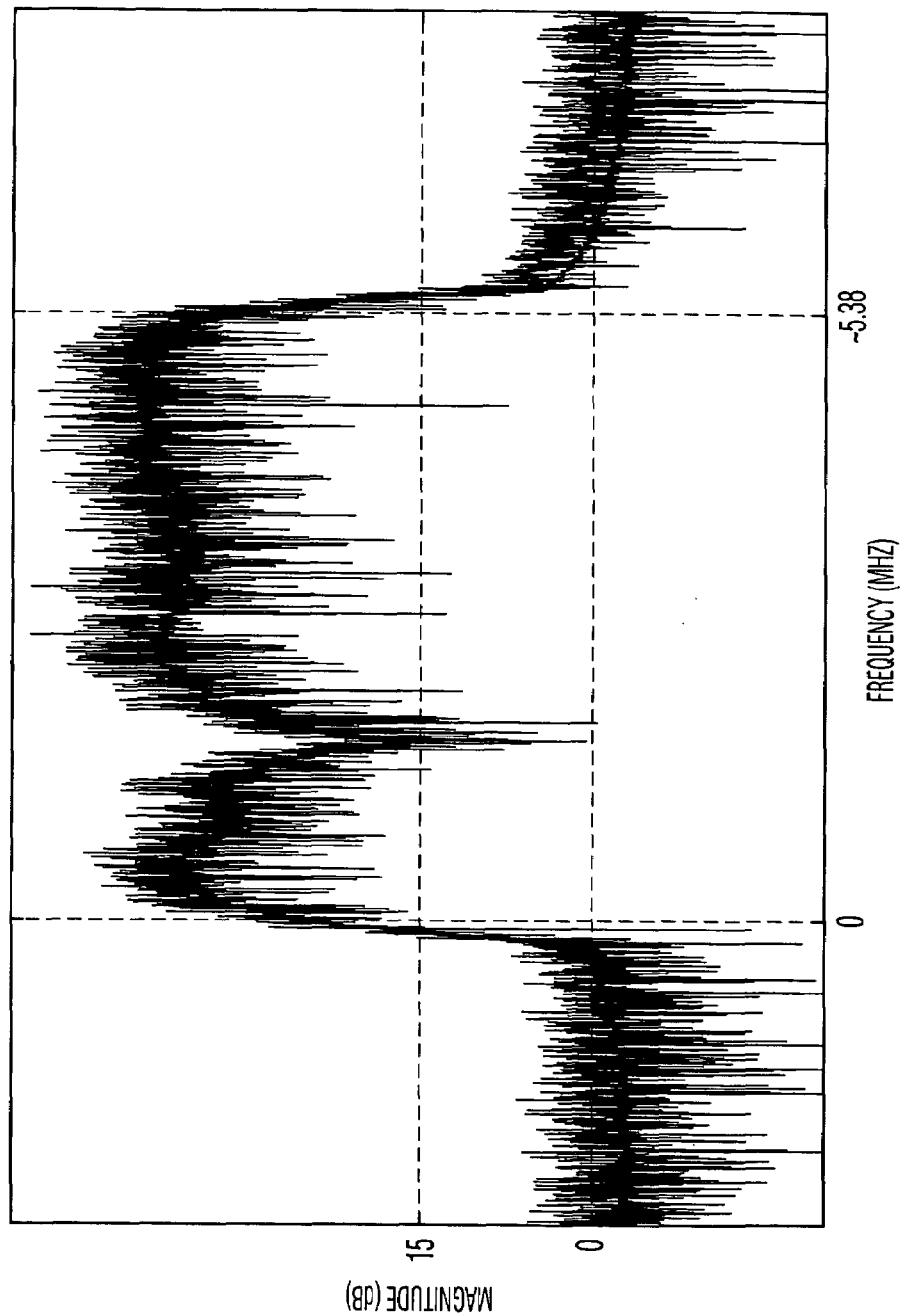
Figure 3D:
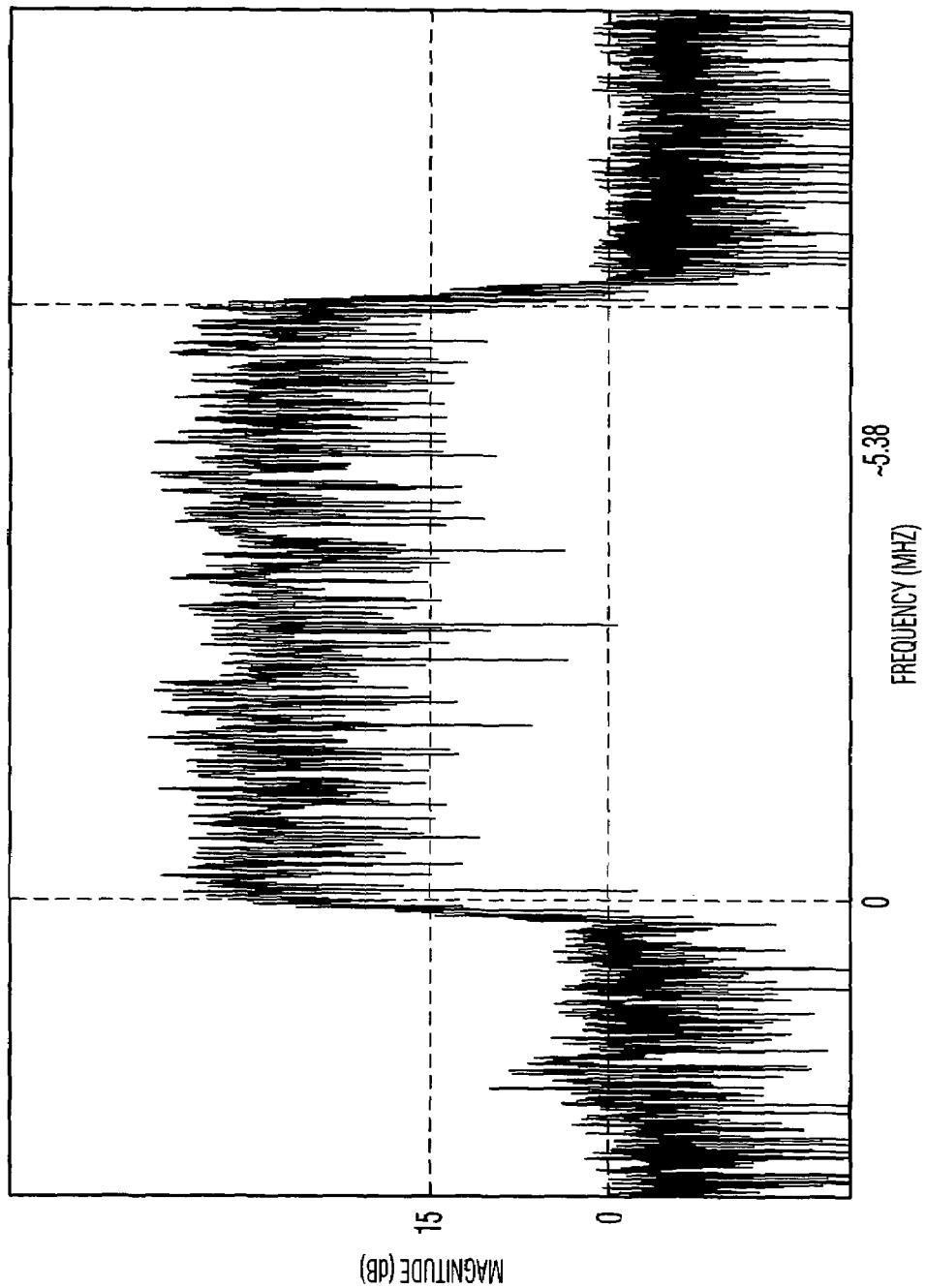
Figure 4A:
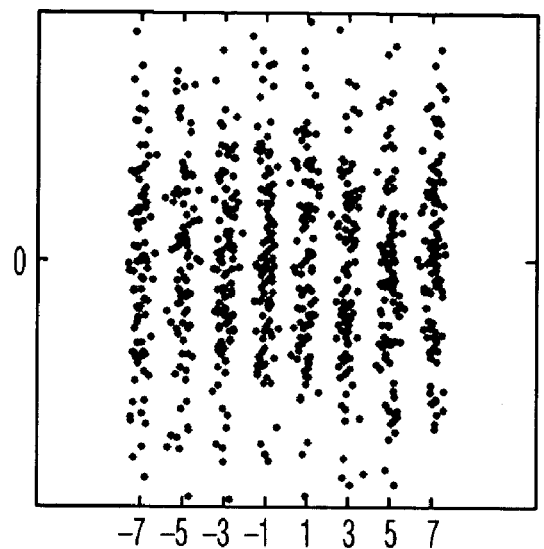
Figure 4B:
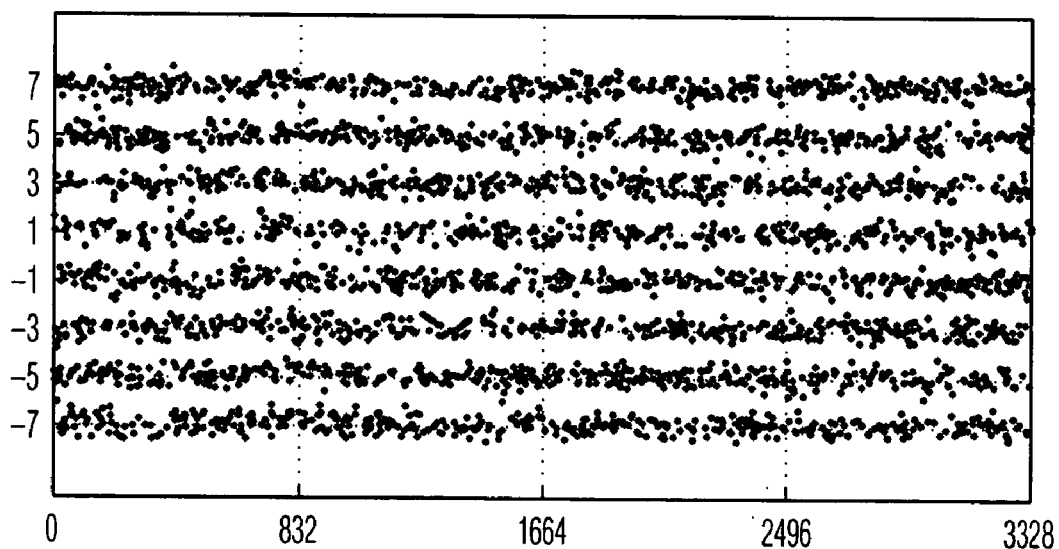
Figure 4C:
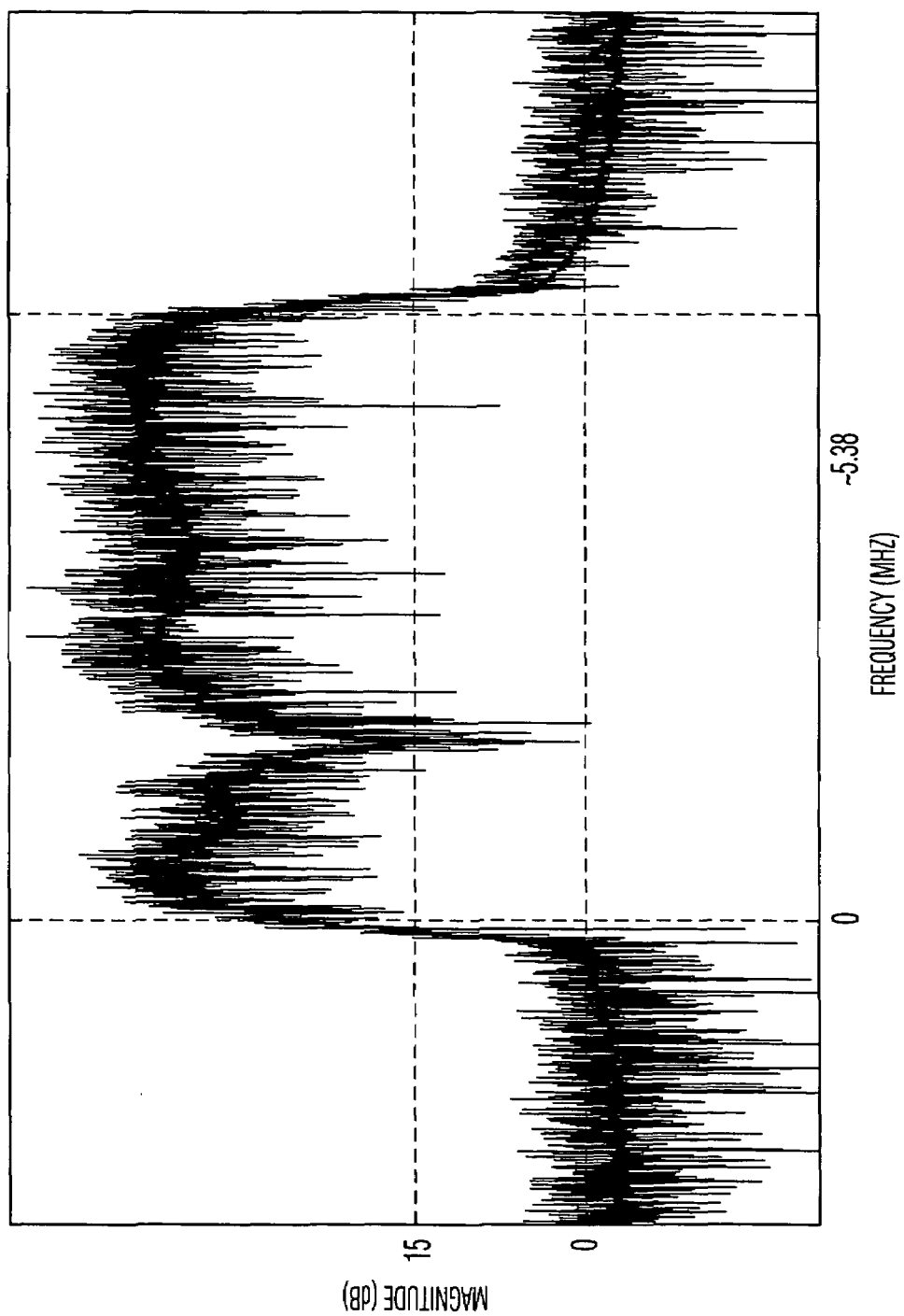

FIGS. 3A and 4A depict the real part of the conventional IIR-CMA equalizer output for a segment (832 symbols) prior to the quantizer, while FIGS. 3B and 4B depict the constellation (equalizer eye) diagram of the equalizer output for four segments. FIGS. 3C and 4C depict the baseband input power spectrum to, respectively, the pre-equalizer (for FIG. 3C) or conventional adaptive equalizer (for FIG. 4C), while FIGS. 3D and 4D depict the baseband output power spectrum from the conventional adaptive equalizer. From these power spectrums, the VSB-MOE pre-equalizer can be seen as having whitened the signal.

Figure 3E:
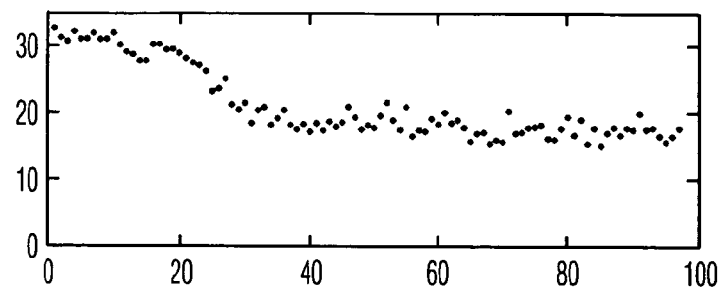
Figure 4E:
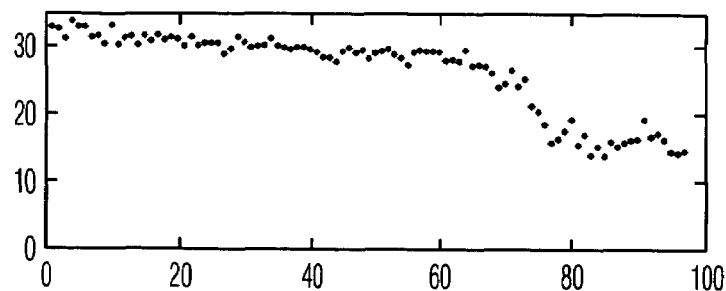

FIGS. 3E and 4E depict the mean square error (MSE) for the equalizer output calculated for each segment from the last 832 symbols, with the vertical axis representing mean square error percentage (MSE %) and the horizontal axis representing the segment number. As shown, the channel begins converging after 20 segments with the VSB-MOE pre-equalizer (FIG. 3E), but not until approximately 70 segments without the VSB-MOE pre-equalizer (FIG. 4E).

Figure 3F:
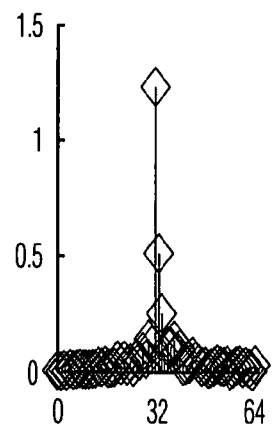
Figure 3G:
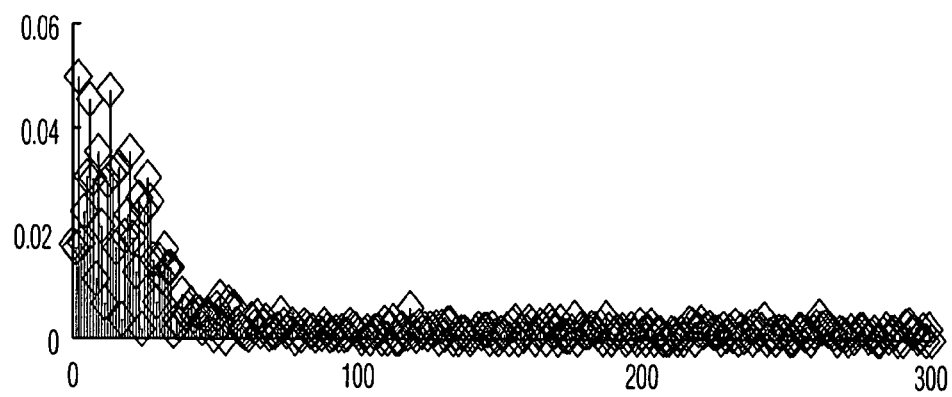
Figure 4F:
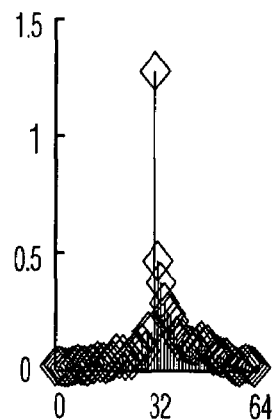
Figure 4G:
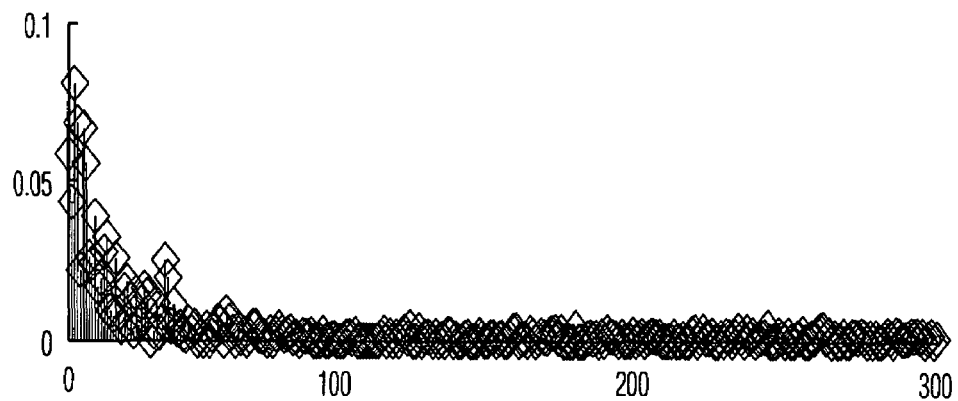
Figure 5A:
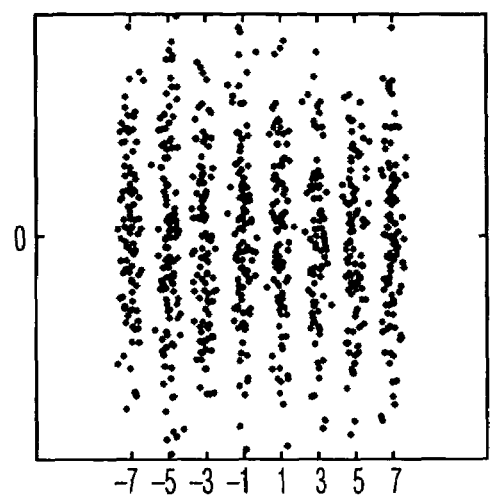
Figure 5B:
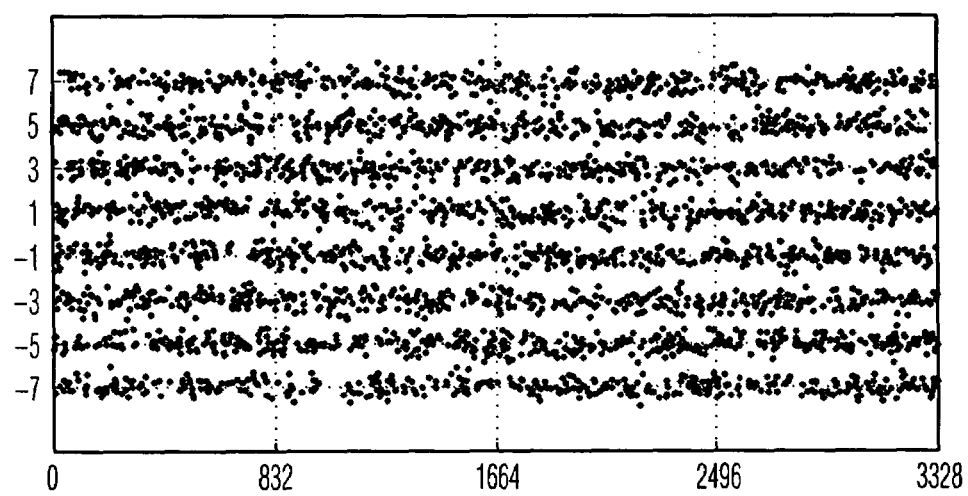
Figure 5C:
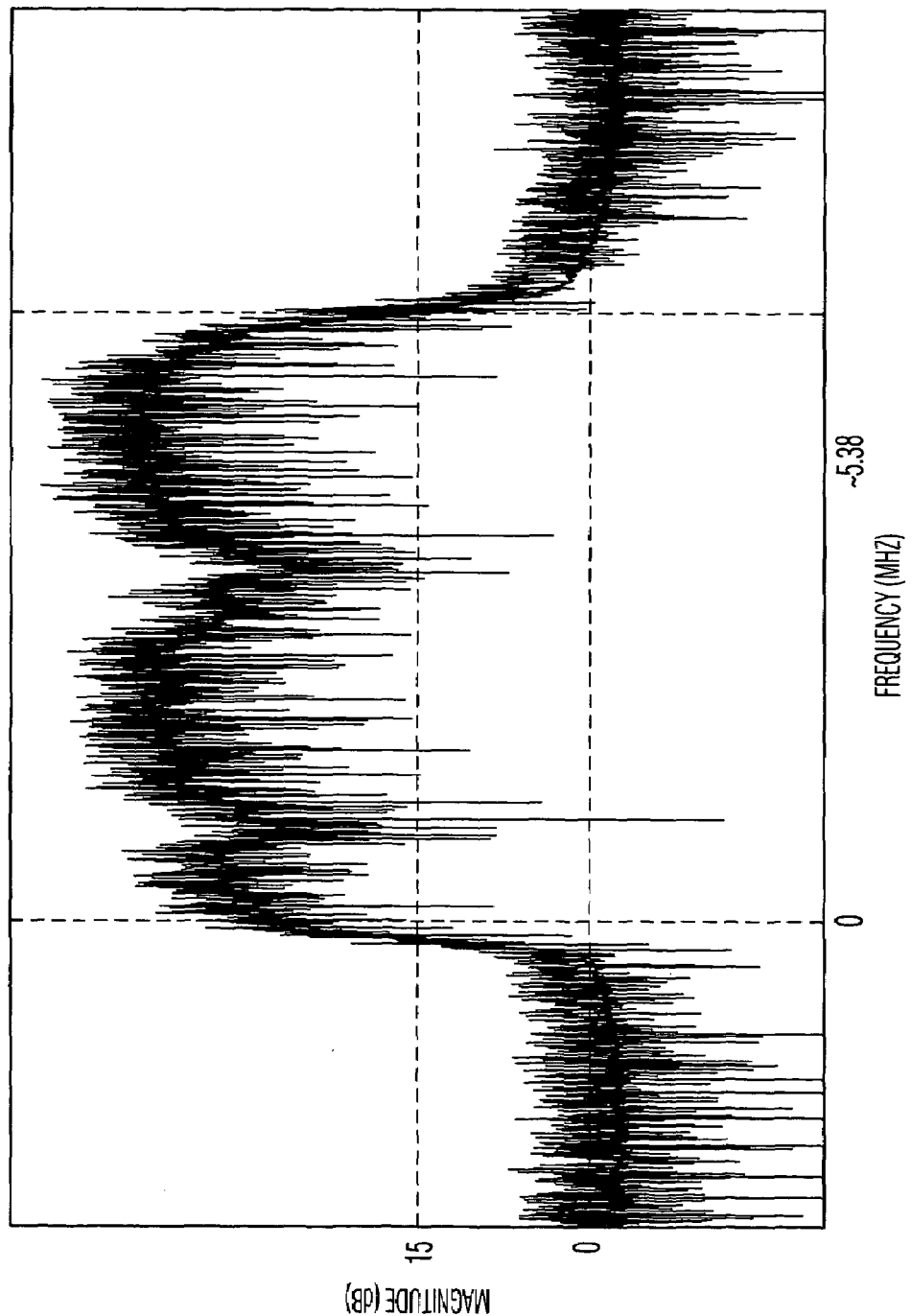
Figure 5D:
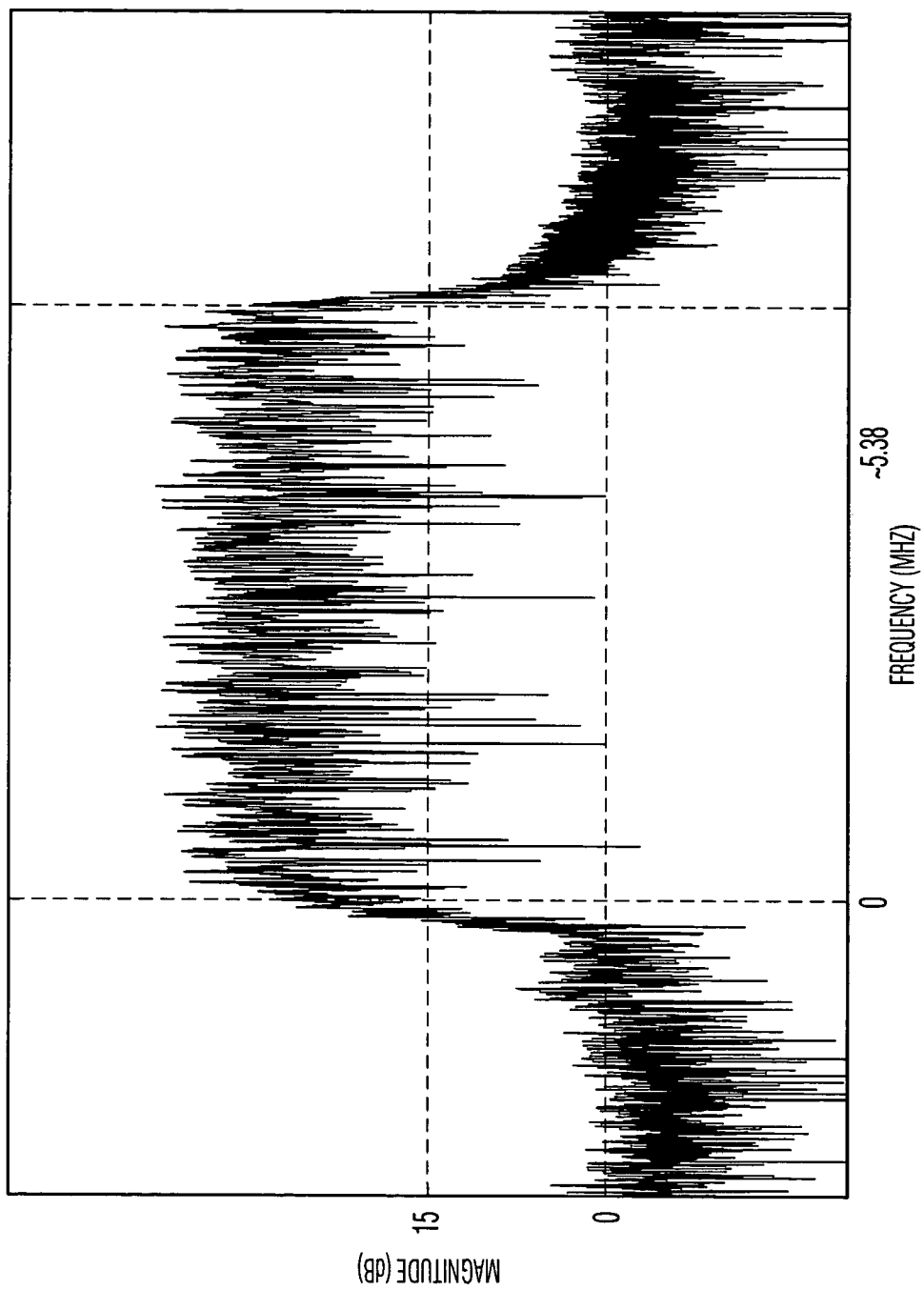
Figure 5E:
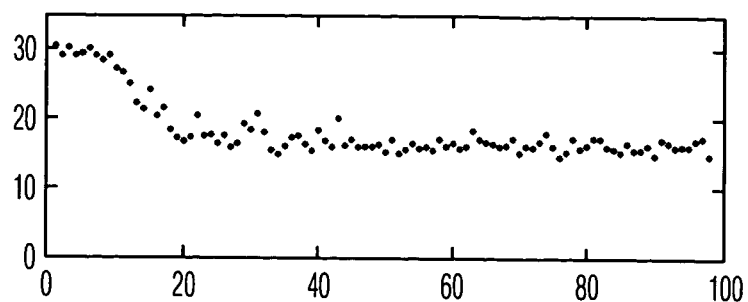
Figure 5F:
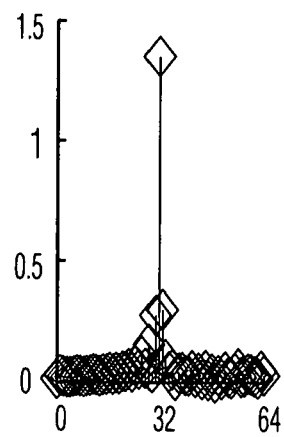
Figure 5G:
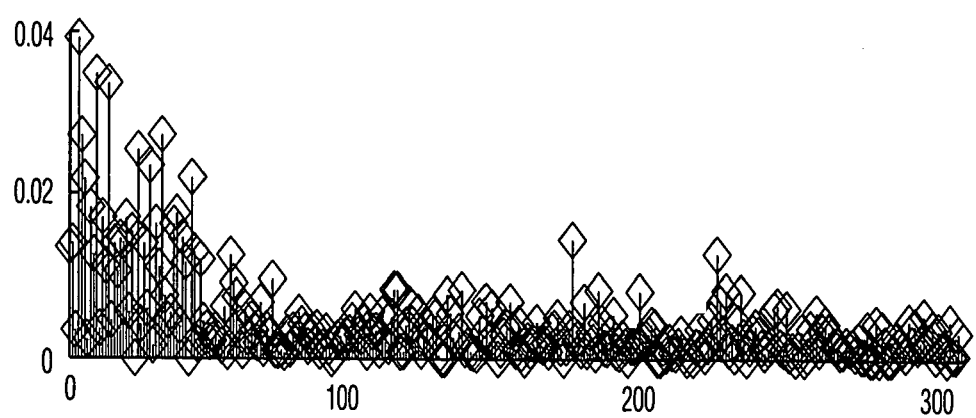

FIGS. 3F and 4F illustrate the feed-forward magnitude for the two simulations, while FIGS. 3G and 4G illustrate the feedback filter coefficients.

A second simulation was performed using the parameters:
MOE FB filter length=16
FF filter length=64
FB filter length=300
MOE FB filter step size=0.0005
IIR-CMA FF filter step size=0.0004 (CMA mode), 0.003 (DD mode)
IIR-CMA FB filter step size=0.00005 (CMA mode), 0.001 (DD mode)

Figure 6A:
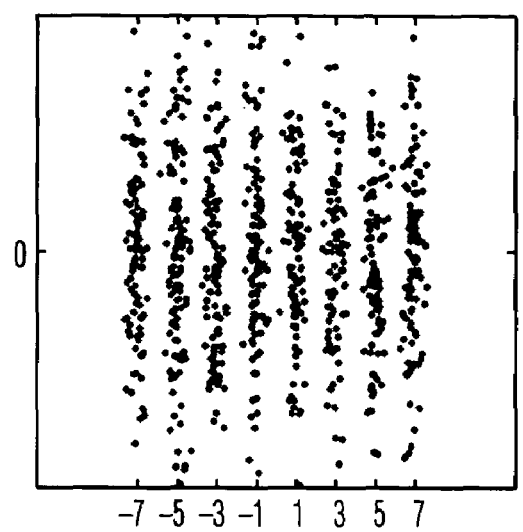
Figure 6B:
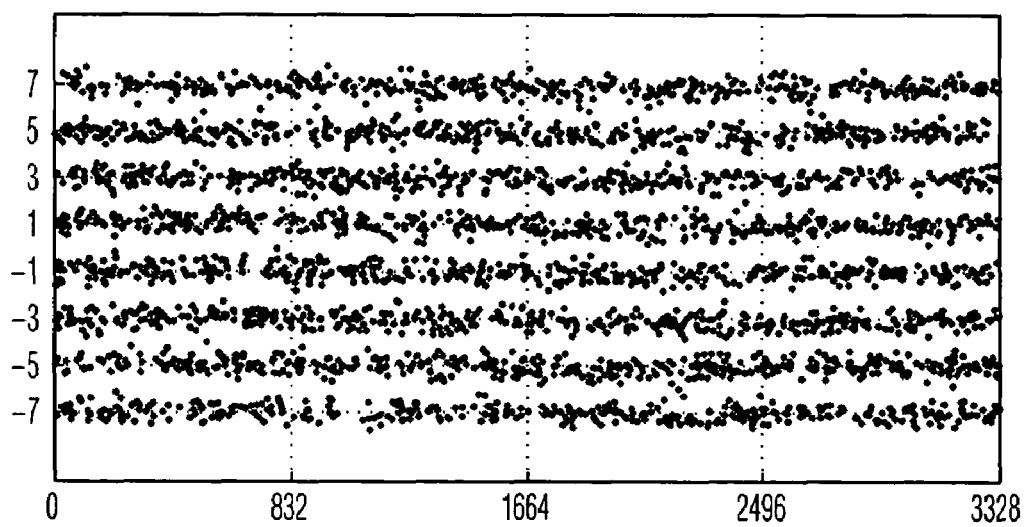
Figure 6C:
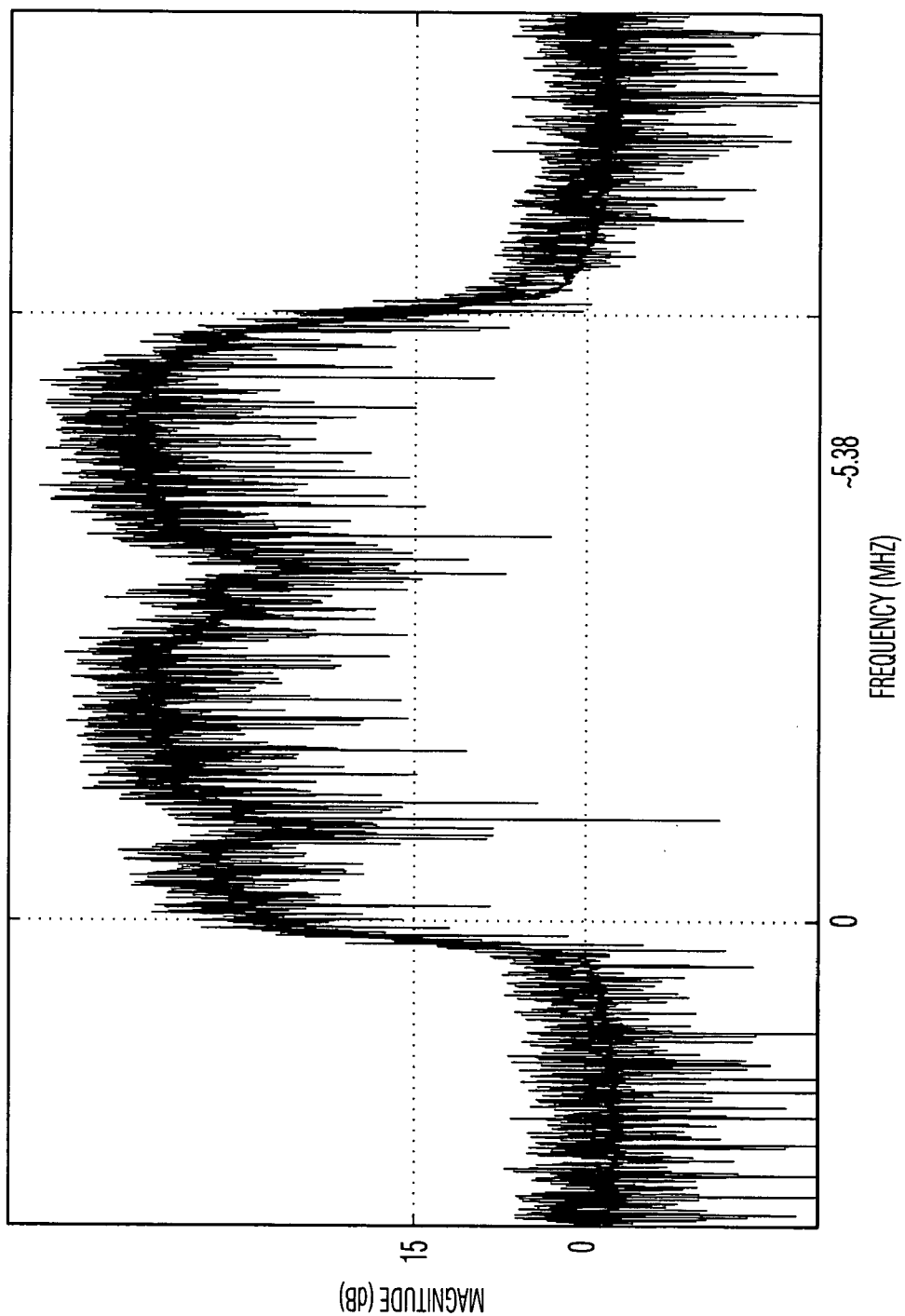
Figure 6D:
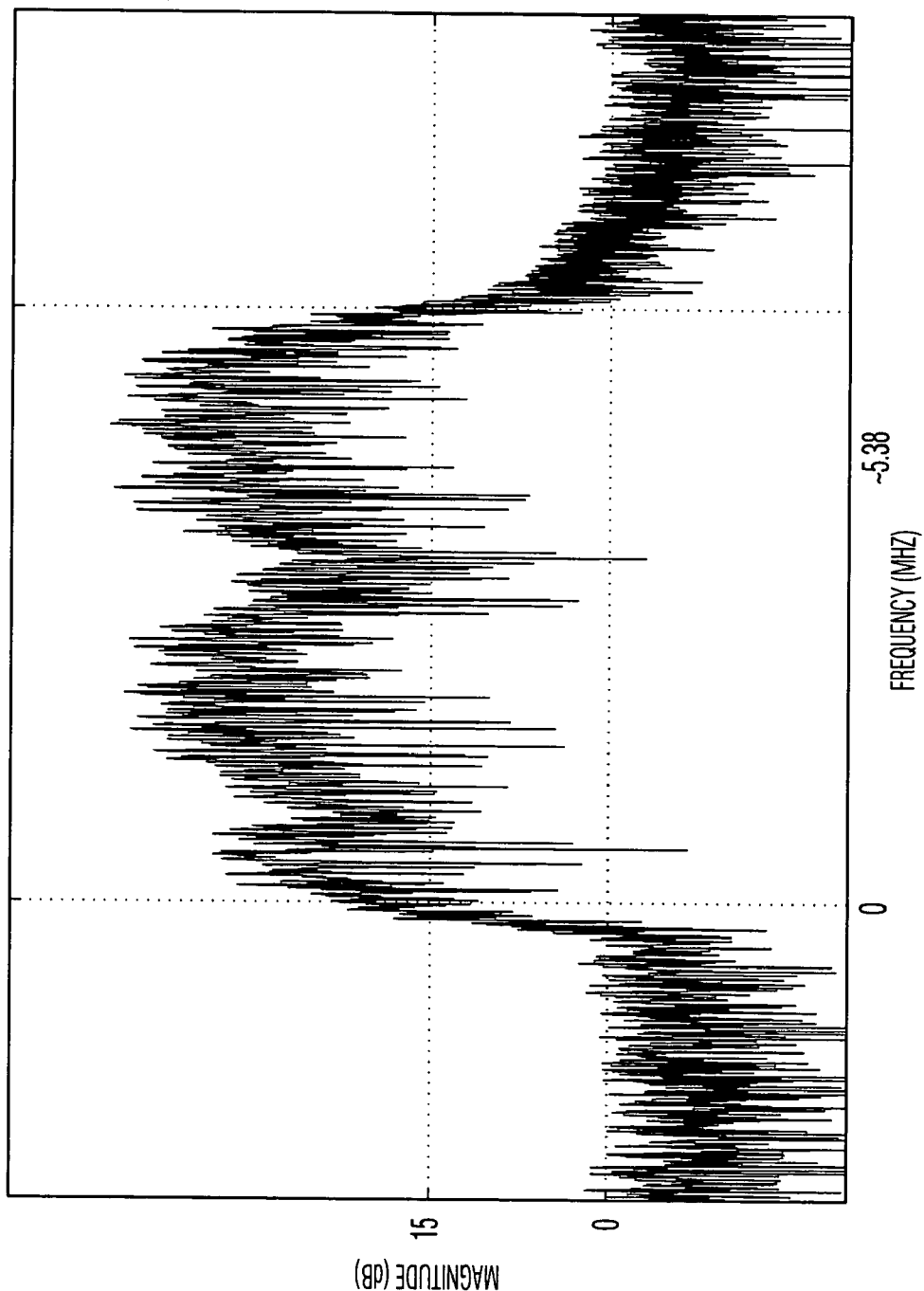
Figure 6E:
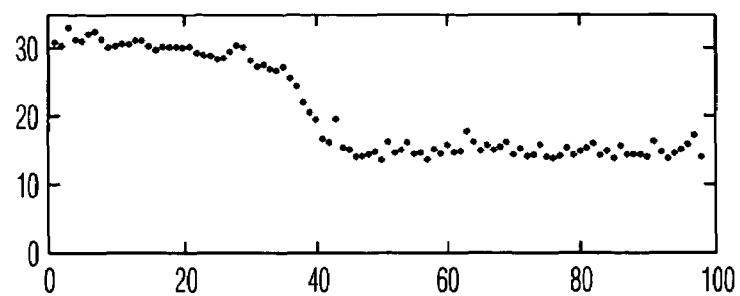
Figure 6F:
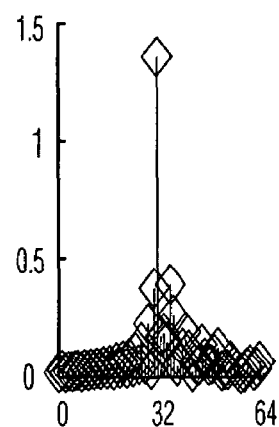
Figure 6G:
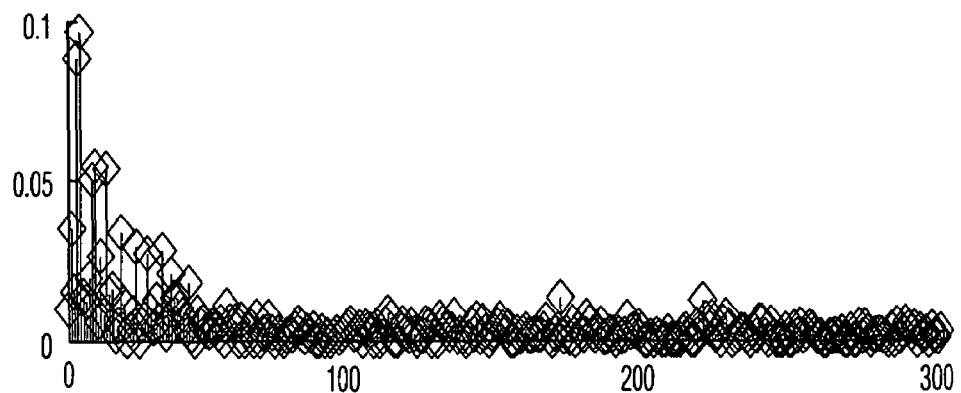

FIGS. 5A through 5G correspond to the simulation with the VSB-MOE pre-equalizer, while FIGS. 6A through 6G correspond to the simulation without the VSB-MOE pre-equalizer. The content of FIGS. 5A–5G and 6A–6G corresponds to the content of similarly designated plots within FIGS. 3A–3G and 4A–4G. In this simulation, the conventional adaptive equalizer entered DD mode after 12 segments when the pre-equalizer was employed (FIG. 5E), while 34 segments were required before the switch without the pre-equalizer (FIG. 6E).

It is important to note that while the present invention has been described in the context of a fully functional system, those skilled in the art will appreciate that at least portions of the mechanism of the present invention are capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A pre-equalizer comprising:
   a signal adder;
   at least one adaptive filter coupled to the signal adder, an input to the pre-equalizer, and an output from the pre-equalizer, the at least one adaptive filter operating on one of an input signal to the pre-equalizer, or an output signal from the pre-equalizer and generating a signal which is added by the signal adder to the input signal, said adaptive filter having a feed-forward filter coupled between the signal adder and the output from the pre-equalizer and a feedback filter coupled within a feedback loop between the output from the pre-equalizer and the signal adder, where the pre-equalizer is an auto-regressive moving average filter;
   wherein adaptation of the at least one adaptive filter is derived by minimizing an output energy cost function defined for the pre-equalizer, and
   wherein the pre-equalizer generates an equalized output signal from the input signal for transmission to an equalizer performing channel equalization.

2. A pre-equalizer comprising:
   a signal adder;
   at least one adaptive filter coupled to the signal adder, an input to the pre-equalizer, and an output from the pre-equalizer, the at least one adaptive filter operating on one of an input signal to the pre-equalizer, or an output signal from the pre-equalizer and generating a signal which is added by the signal adder to the input signal, said adaptive filter having a feed-forward filter coupled between the input to the pre-equalizer and the signal adder; and
   a unity gain filter coupled between the input to the pre-equalizer and the signal adder in parallel with the feed-forward filter,
   wherein the pre equalizer is a transversal filter;
   wherein adaptation of the at least one adaptive filter is derived by minimizing an output energy cost function defined for the pre-equalizer, and
   wherein the pre-equalizer generates an equalized output signal from the input signal for transmission to an equalizer performing channel equalization.

3. The pre-equalizer according to claim 1, wherein adaptation of the at least one adaptive filter employs a minimum output energy blind criterion algorithm.

4. The pre-equalizer according to claim 1, wherein the at least one adaptive filter employs only real coefficients.

5. The pre-equalizer according to claim 1, wherein the at least one adaptive filter is a linear filter employing real coefficients and acting on complex symbol spaced input samples to generate complex symbol spaced output samples.

6. A receiver comprising:
   an input for receiving an input signal;
   a channel equalizer; and
   a pre-equalizer coupled between the input and the channel equalizer, the pre-equalizer comprising:
   a signal adder;
   at least one adaptive filter coupled to the signal adder, an input to the pre-equalizer, and an output from the pre-equalizer, the at least one adaptive filter operating on one of an input signal to the pre-equalizer or an output signal from the pre-equalizer and generating a signal which is added by the signal adder to the input signal, said adaptive filter having a feed-forward filter coupled between the signal adder and the output from the pre-equalizer and a feedback filter coupled within a feedback loop between the output from the pre-equalizer and the signal adder, where the pre-equalizer is an auto-regressive moving average filter;
   wherein adaptation of the at least one adaptive filter is derived by minimizing a output energy cost function defined for the pre-equalizer, and wherein the pre-equalizer generates an equalized output signal from the input signal for transmission to the channel equalizer.

7. A receiver comprising:
an input for receiving an input signal;
a channel equalizer; and
a pre-equalizer coupled between the input and the channel equalizer, the pre-equalizer comprising:
a signal adder;
at least one adaptive filter coupled to the signal adder, an input to the pre-equalizer, and an output from the pre-equalizer, the at least one adaptive filter operating on one of an input signal to the pre-equalizer or an output signal from the pre-equalizer and generating a signal which is added by the signal adder to the input signal, said adaptive filter having a feed-forward filter coupled between the input to the pre-equalizer and the signal adder; and
a unity gain filter coupled between the input to the pre-equalizer and the signal adder in parallel with the feed-forward filter,
wherein the pre-equalizer is a transversal filter;
wherein adaptation of the at least one adaptive filter is derived by minimizing a output energy cost function defined for the pre-equalizer, and
wherein the pre-equalizer generates an equalized output signal from the input signal for transmission to the channel equalizer.

8. The receiver according to claim 6, wherein adaptation of the at least one adaptive filter employs a minimum output energy blind criterion algorithm.

9. The receiver according to claim 6, wherein the at least one adaptive filter employs only real coefficients.

10. The receiver according to claim 6, wherein the at least one adaptive filter is a linear filter employing real coefficients and acting on complex symbol spaced input samples to generate complex symbol spaced output samples.

11. A method of pre-equalizing a received signal comprising:
adaptively filtering one of an input signal, an output signal or both to generate an equalized output signal, wherein the filtering is adapted by minimizing an output energy cost function defined for the equalized output signal, wherein adaptive filtering employs a feed-forward filter coupled between a signal adder and an output for the output signal and employs a feedback filter coupled within a feedback loop between the output and the signal adder, where the feed-forward and feedback filters form an auto-regressive moving average filter; and
transmitting the equalized output signal to an equalizer performing channel equalization.

12. A method of pre-equalizing a received signal comprising:
adaptively filtering one of an input signal, an output signal or both to generate an equalized output signal, wherein the filtering is adapted by minimizing an output energy cost function defined for the equalized output signal, wherein adaptive filtering employs a feed-forward filter coupled between an input for the input signal and a signal adder and employs a unity gain filter coupled between the input and the signal adder in parallel with the feed-forward filter, wherein the feed-forward and unity gain filters form a transversal filter; and
transmitting the equalized output signal to an equalizer performing channel equalization.

13. The method according to claim 11, wherein adaptation of the filtering employs a minimum output energy blind criterion algorithm.

14. The method according to claim 11, wherein the adaptive filtering employs only real coefficients.

15. An equalized output signal generated by the method as set forth in claim 11.

* * * * *